United States Patent [19]

Hughes

[11] Patent Number: 5,367,798
[45] Date of Patent: Nov. 29, 1994

[54] CONNECTOR PIN ASSEMBLY FOR BUCKET RIGGING

[75] Inventor: James T. Hughes, Mt. Vernon, Ohio

[73] Assignee: Indresco Inc., Dallas, Tex.

[21] Appl. No.: 13,525

[22] Filed: Feb. 4, 1993

[51] Int. Cl.⁵ .............................................. A01B 3/58
[52] U.S. Cl. ...................................... 37/399; 37/397; 403/317
[58] Field of Search ............... 37/399, 398, 397, 396, 37/395, 455, 456, 457, 458, 459; 403/155, 162, 316, 317

[56] References Cited

U.S. PATENT DOCUMENTS

| | | | |
|---|---|---|---|
| 1,844,858 | 2/1932 | Lehman | 37/399 |
| 2,092,556 | 9/1937 | Page . | |
| 2,278,708 | 4/1942 | Miller . | |
| 2,862,314 | 12/1958 | Larsen . | |
| 2,957,255 | 10/1960 | Larsen . | |
| 3,112,572 | 12/1963 | Larsen . | |
| 3,541,710 | 11/1970 | Sankey et al. . | |
| 3,681,808 | 8/1972 | Hahn et al. | 37/399 X |
| 4,182,578 | 1/1980 | Livesay et al. . | |
| 4,316,636 | 2/1982 | Taylor et al. | 37/455 X |
| 4,329,794 | 5/1982 | Rogers . | |
| 4,611,417 | 9/1986 | Carlson | 37/455 |
| 4,689,904 | 9/1987 | Briscoe . | |
| 4,944,102 | 7/1990 | Behlesdorf et al. . | |
| 5,009,017 | 4/1991 | Diekevers et al. . | |
| 5,127,764 | 7/1992 | Baer . | |
| 5,140,761 | 8/1992 | Coffman . | |

Primary Examiner—Randolph A. Reese
Assistant Examiner—Spencer Warnick
Attorney, Agent, or Firm—Baker & Botts

[57] ABSTRACT

A dragline bucket rigging includes at least one pair of components removably secured together by a connector pin assembly including a U-shaped spring retainer clip. The clip removably snap-fits beneath a protective cap secured to the outside face of one of the components and within an open-ended channel defined between the cap and the component face. Legs of the retainer clip abut the sides of the channel and nest within a pair of diverging slots formed one on each side of a retainer pin when the latter telescoped through an opening formed within the cap and into a connector pin hole in the component. The legs thereby act to prevent the pin from rotating or being removed axially from the hole and yet the clip can be easily removed allowing the pin to be removed axially to disconnect the rigging components.

7 Claims, 3 Drawing Sheets

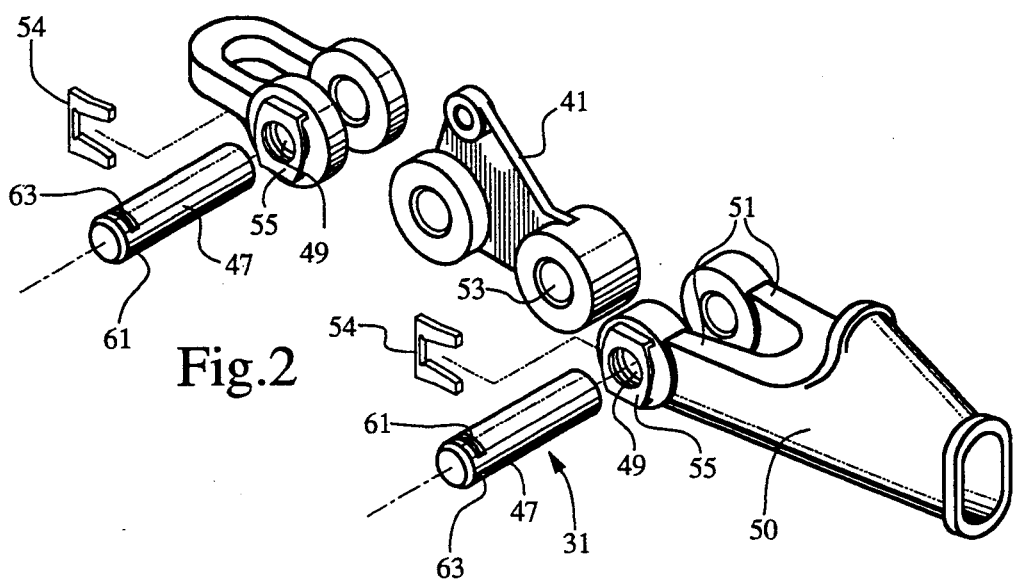
Fig.2
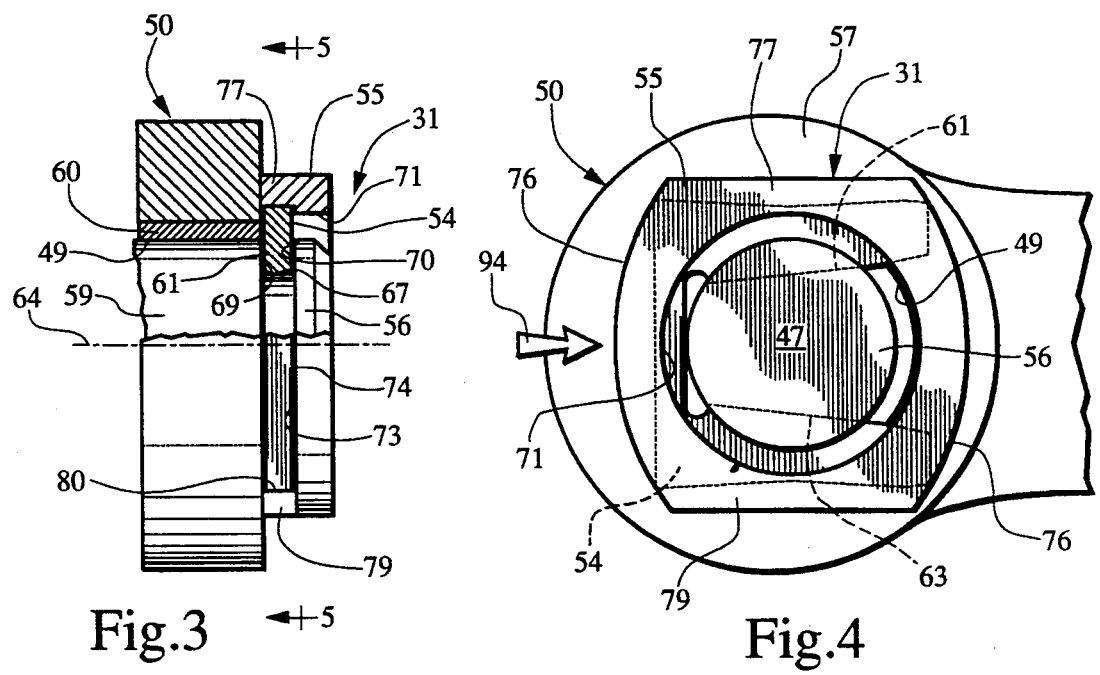
Fig.3
Fig.4

5,367,798

1

CONNECTOR PIN ASSEMBLY FOR BUCKET RIGGING

BACKGROUND OF THE INVENTION

1. Technical Field

The present invention relates generally to dragline bucket rigging and more particularly to a pin connector assembly for securing together two components of the rigging.

2. Background Information

Typically, dragline bucket rigging comprises a number of lines in the form of ropes, chains, or cables connected in the form of a series of straight lines and slings and attached between a drag bucket and the main operating cables of a dragline. By variously pulling on selected lines, the bucket may be pulled through the earth collecting material, lifted, maneuvered, and tilted to dump the collected material in a selected location. At the connecting ends of these lines, components of the rigging include various forms of links and yoke shaped members connected together by hard metal connecting pins. For example, draw cables for pulling the bucket to scoop up earthen material may be attached through drag chains secured to opposite sides of the bucket by means of pinned connecting links. Dump cables also connecting to the bucket also connect with the links. Each of the connections to the links includes a yoke-shaped member secured to opposite sides of the link by means of a connecting pin telescoped through the legs of the yoke and the link.

It is important that the pin be securely held within the connection preferably against rotation to avoid premature wearing of the pin and sides of the pin holes and that the mechanism for securing the pin in place be sturdy enough to withstand the harsh environment to which it is exposed. It is also important that it be relatively easy to remove the pin when lines need to be repaired or replaced or when the pin or its retaining mechanism becomes worn excessively.

One prior art form of connection for securing the pin to the yoke member is shown in the accompanying drawing identified as prior art. In this prior art connection, retaining collars are attached to protruding opposite end positions of the pins adjacent the outer sides of the rigging component. With reference specifically to the prior art Fig., each of the collars 10 is assembled from two separate generally U-shaped half pieces 11 and 13. The pieces each include a rigid bridge 14 with inner and outer flat sides 15 and 16 integrally formed with arched legs 17 each of which includes a weld notch 19 at its free end. In assembly with the end of the pin, the inner flat side of the bridge of the upper half piece seats within an upper notch 20 extending in a chordwise direction across an exposed end portion of the pin. The lower half piece of the pin is inserted in a parallel lower notch 21 in the same manner and the two half pieces are welded together at the notches 19. At least one of the collars is welded together after inserting the pin through the two rigging components being connected together. The collars thus act to keep the pin from sliding axially out of the pin holes in the components. To keep the pin from rotating, upper and lower blocks 23 and 24 are welded to the outside of the rigging component adjacent the outer flat sides of the rigid bridge. To remove the pin, at least the notch weld must be cut.

2

SUMMARY OF THE INVENTION

The present invention generally aims to provide an improved connector pin assembly which includes the advantages of being protected against the harsh operating environment of a dragline and of preventing connector pin rotation and yet is easier to assemble and disassemble when connecting together rigging components. More specifically, the present invention contemplates achieving this by means of a novel arrangement for holding the pin between the rigging components from only one end of the pin and in a manner which eliminates the need of cutting or breaking welds to remove the pin or rewelding when replacing the pin.

In particular the invention resides in use of a unique spring clip retainer which may be inserted easily beneath a novel protective cap with a snap fit, coacting therewith to secure the pin within its pin hole both against rotation and axial removal. Just as easily the retainer may be removed, enabling the pin to be slid axially from between the rigging components for separation and servicing of the rigging components or for other purposes.

Still further the invention resides in the novel interfitting relationship between the retainer clip, cap and pin and the unique construction of the cap in providing wear protection for the retainer.

The foregoing and other advantages of the present invention will become more apparent from the following description of the preferred embodiment when taken in conjunction with the accompanying drawings.

BRIEF DESCRIPTION OF THE DRAWING

FIG. 2 is an enlarged exploded perspective view of a coupling arrangement between components of the rigging assembly of FIG. 1 and incorporating the novel connector pin assembly of the present invention.

FIG. 3 is an end elevational view of a rigging component incorporating the novel connector pin assembly of the present invention with portions thereof broken away and shown in cross-section for clarity of illustration.

FIG. 4 is a side elevational view of a fragmentary portion of the rigging component shown in FIG. 3.

BEST MODE FOR CARRYING OUT THE INVENTION

Figure 1:
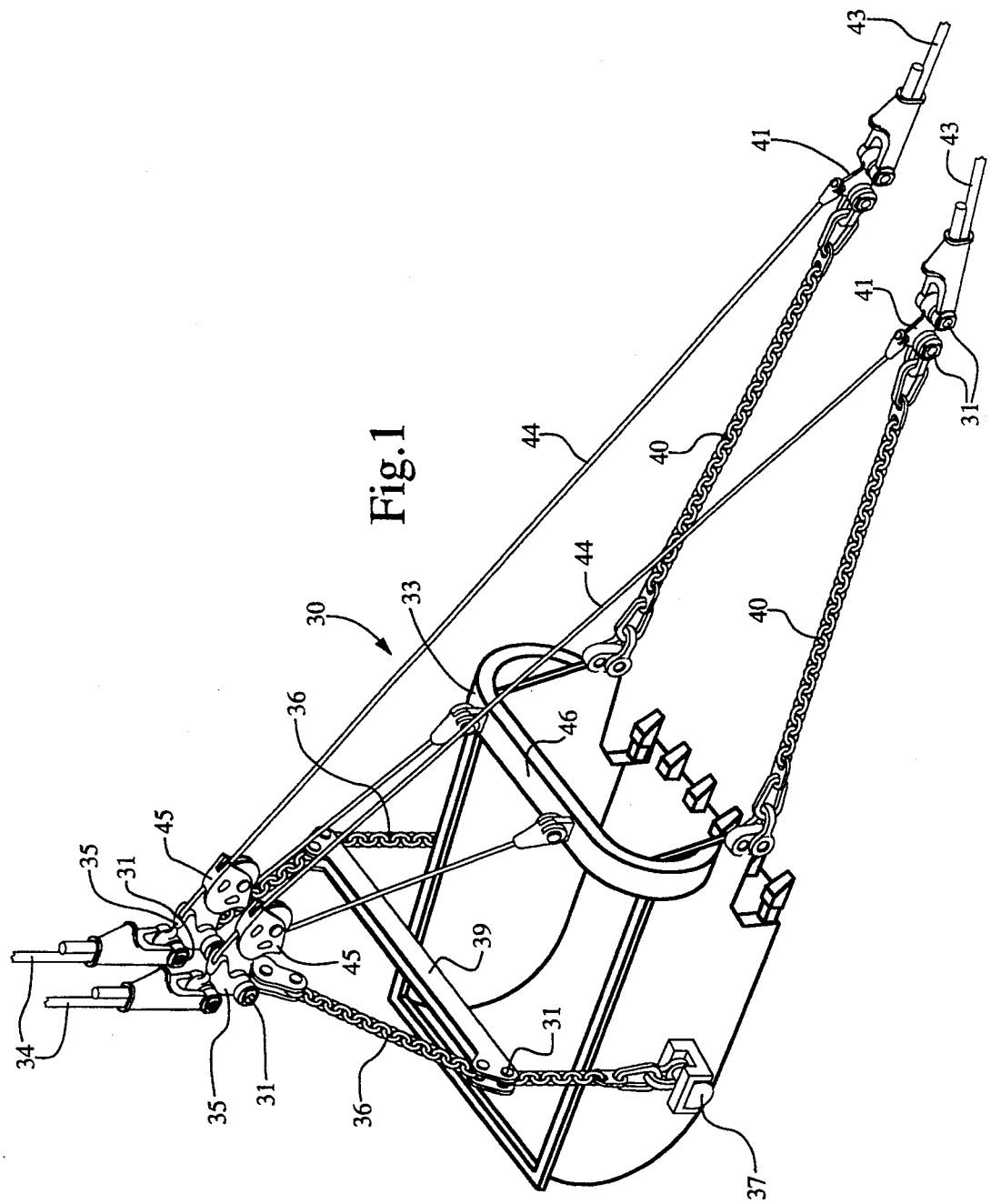
FIG. 1 is a perspective view of various components of a dragline bucket rigging with the bucket shown in phantom.

As shown in the drawings for purposes of illustration, the present invention is embodied in a novel dragline bucket rigging 30 and specifically in a unique connector pin assembly 31 for connecting together at least some of the components of the rigging. In the present instance, dragline bucket rigging comprises a number of lines in the form of cables and chains connected between a bucket 33 (shown in phantom lines in FIG. 1) and a dragline machine (not shown). Hoist cables 34 from the dragline boom (not shown) are connected through hoist links 35 by chains 36 to trunnions 37 on opposite sides of the bucket. A spreader bar 39 connects between the hoist chains intermediate the ends thereof, spanning the width of the bucket. Connected to adjacent the bottom of the front sides of the bucket are the bucket ends of drag chains 40. The other ends of the drag chains are connected by drag links 41 to drag cables 43 leading directly back to the machine. Also connected to the drag links are the ends of dump cables 44. The latter are wrapped around dump blocks 45 that are connected to the hoist links 35. The other ends of the dump cables are connected adjacent opposite ends of an arch 46 spanning the sides of the mouth of the bucket.

Virtually all of the aforementioned connections between the different sections or components of the rigging 30 as well as between the rigging and the bucket 33 and the hoist and drag cables 34 and 43 are pinned connections. Specifically, these connections employ a hard metal pin 47 which is telescoped through aligned holes 49 in adjacent rigging components and is retained against sliding axially out of the pin holes during operation of the dragline. While different specific pieces of hardware in the form of shackles or clevises, and sockets may be utilized at each of the connections between the chains and cables of the rigging and to the bucket, generally each of the connections includes a yoke-shaped component such as the socket 50 shown in FIG. 2 having two legs 51 with spaced pin holes 49 aligned axially with each other. An intermediate plate-like component in the form of the link 41 fits within the space between the legs. A pin hole 53 extends through the intermediate member and is aligned with the socket pin holes 49 so that when the pin 47 is inserted into the aligned three holes the two interfitting components are linked pivotally together by the pin.

In accordance with the present invention, a novel arrangement is provided for holding the pin 47 between the two rigging components 41 and 50 at only one of the ends of the pin and may be easily removed to release the pin for disconnection of the components. For these purposes, the arrangement includes unique pin retainer clip 54 which may be easily secured with a snap fit beneath a novel protective cap 55 that is attached to the side of one of the rigging components around the pin hole 49. The clip interfits with the cap and the pin reacting therewith both to hold the pin against sliding axially out of the pin hole and against rotation. By virtue of this arrangement, the two rigging components are held securely together with the retainer protected against the harsh operating environment of the dragline and yet assembly or disassembly of the bucket rigging 30 may be accomplished quickly and easily to help minimize downtime from operation of the dragline.

In the present instance, the pin 47 includes a head end portion 56 protruding from a side 57 of the socket 50 and an inner end portion 59 of the same diameter extending into the pin hole 49. Within the pinhole is a wear bushing 60. Formed within the head end portion are two tapered slots 61 and 63 located generally diametrically of each other (see FIG. 5a). The slots open outside of the pin hole (see FIG. 3) in generally opposite directions within a plane extending generally perpendicular to a central axis 64 of the pin. Bottom surfaces 66 and 67 of the slots extend generally chordwise of the cross-section area of said pin and converge toward each other upon progressing from one side of the pin to the other. Integrally connected with the bottom surfaces are sidewalls 69 and 70 which are axially spaced from each other a preselected distance and extend in a generally perpendicular direction relative to the axis of the pin.

Figure 5A:
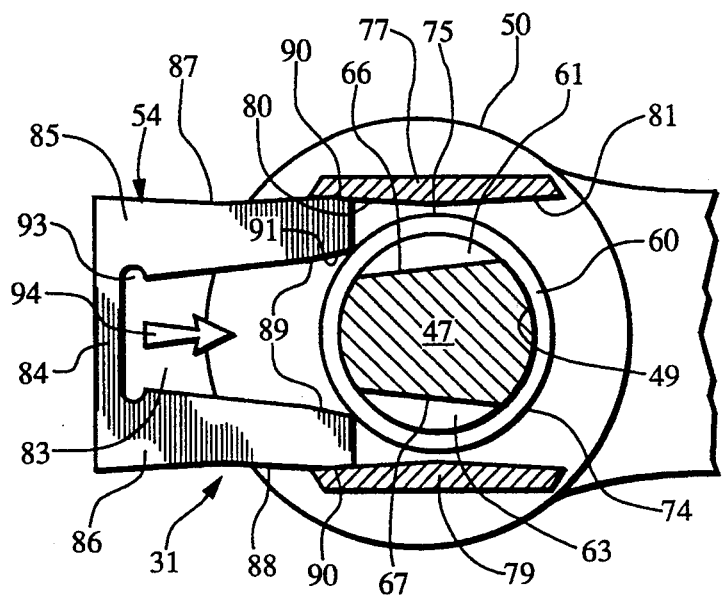
FIGS. 5a-c are cross-sectional views taken substantially along line 5—5 of FIG. 3 showing sequentially the relative positions of parts of the connector pin assembly of the present invention when connecting together parts of the assembly.
Figure 5B:
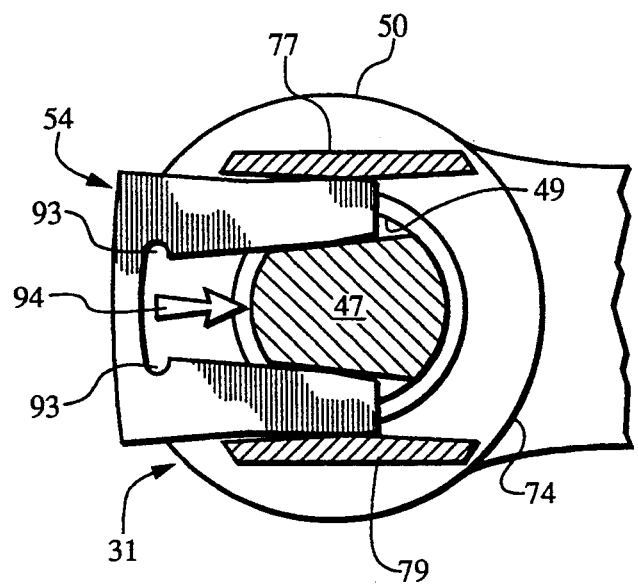
Figure 5C:
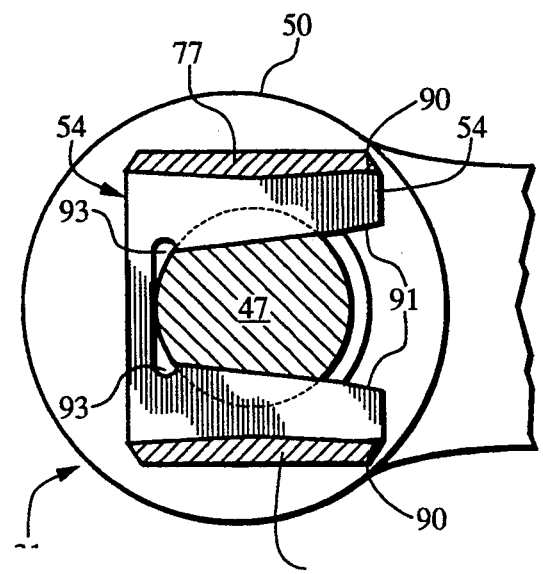

To secure the pin 47 to the socket 50, the retainer clip 54 is made of a hard metal spring material herein AISI 4140 alloy steel with a quenched and tempered heat treatment to a Rockwell C scale hardness in the range of 48 to 52. Specifically, the clip fits within the slots 61 and 63 removably interlocking with the protective cap or plate 55. The cap is secured to the member around the pin hole 49 and includes a central opening 71 (see FIG. 4) which is slightly larger than the pin hole allowing the pin to be easily inserted into the pin hole from outside of the cap. Formed within an inner side 73 of the cap is a channel 74 which extends generally diametrically thereacross. As shown in FIGS. 5a-5c, the channel has a narrowed mid-section 75 and larger opposite ends opening from the peripheral edge 76 (see FIG. 4) of the cap on opposite sides of the opening 71. Specifically, the channel is defined by first and second shoulders 77 and 79 which are integrally formed with the cap and by means of which the cap is welded to the outside face 57 of the socket 50. Each of the shoulders includes first and second interior walls 80 and 81 which intersect each other at the narrowed mid-section of the channel. The interior walls extend generally perpendicular to the inner side 73 (see FIG. 3). With the channel opening from opposite sides of the peripheral edge of the cap, the spring clip 54 may be inserted beneath the cap to interlock with the pin slots 61 and 63 and the channel walls 80 and 81.

The clip 54 itself is generally horseshoe shaped with a central u-shaped opening 83 (see FIG. 5a) and having a central section 84 integrally formed with two side legs 85 and 86. Generally, outside surfaces 87 and 88 of the legs are complementary to the shape of the interior walls 80 and 81 of the cap shoulders 77 and 79 while an inside surface 89 is complimentary to the shape of the taper of the bottom surfaces 66 and 67 of the pin slots 61 and 63. The free ends of the legs each include chamfers 90 and 91 (see FIG. 5c) on both the inside and outside surfaces, respectively, for ease in sliding over the bottoms of the pin slots and channel walls 80 and 81. Between the legs, the central section 84 is resiliently flexible allowing the ends of the legs to be flexed or deflected toward each other when the clip is inserted into the channel of the central section bowing slightly as shown in FIG. 5b). Moreover, the closed end of the opening 83 is rounded at its corners 93 for stress relief and stiffness relief allowing the legs 85 and 86 to flex when inserted beneath the cap. Sizing of the clip is such as to fit within said channel with a snap fit with inside edges of the legs nested within the pin slots 61 and 63 against the bottom surfaces 66 and 67. At the same time, outside edges of said legs abut the interior channel walls 80 and 81 so as to lock the pin within the pin hole 49 against both axial removal and rotation.

When mounted on the outside face 57 of the socket 50, the cap is oriented so that the inside walls 80 and 81 are generally parallel to the expected direction of the load which will be applied to the pin 47. By virtue of this orientation, load is kept from being applied across the legs 85 and 86 of the retaining pin. In positioning the pin within the pin hole 49, it is preferably oriented so that the slots 61 and 63 taper toward each other in the direction of the pull on the pin as indicated by the arrow 94 in FIG. 4 for example. Thus, when installing the clip 54, its open end faces toward the direction of the load. For purposes of this disclosure, the direction of load is assumed to be the same direction in which the bucket is pulled. Thus, for example, when the exemplary connector assembly 31 is used to secure the rigging 30 at the bottom front end of the bucket 33, the clip is oriented to open toward the direction that the bucket is pulled to pick up a load of material.

In FIGS. 5a–5c, insertion of the clip 54 into the protective cap channel 74 is illustrated. FIG. 5a shows the clip when initially inserted into the channel with the chamfers 90 and 91 on the outside free ends of the legs 85 and 86 reacting against the inside walls 80 and 81 of the cap shoulders 77 and 79 and camming the legs toward each other. In FIG. 5b, maximum inward deflection of the legs has occurred and further movement to the right causes the legs to flex away from each other. The final position is shown in FIG. 5c, with the legs effectively acting to hold the clip in the direction of the load arrow 94. Removal of the clip is accomplished by using any suitably sized tool to force against the ends of the legs driving them in the reverse direction as insertion. Once past the narrowed mid-section, the clip is easily removed from the channel, allowing the pin 47 to be pulled from the hole 49 to disconnect the two rigging components.

In view of the foregoing, it is seen that the present invention brings to the art a unique pin connector assembly 31 for easily connecting together and disconnecting components of dragline rigging 30. Use of the uniquely shaped protective cap 55, especially shaped slots 61 and 63 in the connector pin 47 and cooperating spring clip 54 enable the pin to be removably attached and yet securely hold the pin against both axial removal and rotation in service use.

I claim:

1. A retainer pin assembly for use in connecting together at least one pair of components of a dragline bucket rigging, said assembly including a pin with an inner end portion telescoped into a hole opening from a side of one of the components in the pair, an open-ended channel in said side and communicating with said hole, said channel having a narrowed mid-section and enlarged opposite ends, a pair of slots on opposite sides of said pin aligned with said channel, a removable spring clip retainer means sized to snap fit within said channel and said slots and inserted therein to lock said pin within said hole against rotation and axial removal.

2. A dragline bucket rigging including at least one connector pin assembly for connecting together components of the rigging, said assembly including a generally cylindrical connecting pin having a head end portion and an inner end portion of substantially the same diameter, said inner end portion being inserted into a hole in one of said components with said head end portion protruding therefrom, said head end portion having first and second slots formed therein generally diametrically of each other and opening therefrom outside of said hole in generally opposite directions generally perpendicular to the central axis of said pin, said slots having bottom surfaces extending generally chordwise of the cross-section of said pin and converging toward each other upon progressing thereacross, each of said slots having sidewalls axially spaced from each other a preselected distance and extending in a generally perpendicular direction relative to the axis of said pin, a cover plate affixed to said component adjacent opposite sides of said hole and including an inner side, a peripheral edge and an outer side with centralized opening extending therethrough, said opening being sized slightly larger than the diameter of said pin and being generally aligned with said hole for movement of said pin therethrough when inserted or removed from said hole, a channel formed across said plate in said inner side and having a narrowed mid-section and larger opposite ends opening from said peripheral edge on opposite sides of said hole, said channel being defined by first and second shoulders integrally formed with said plate, each of said shoulders having first and second interior walls intersecting each other at said mid-section with each of said walls being located in a plane extending generally perpendicular to said inner side, and a generally U-shaped retainer including first and second legs connected together at one end thereof by a resiliently flexible bridging section, said retainer being sized to fit within said channel with a snap fit with inside edges of said legs nested within said first and second slots against said bottom surfaces thereof and outside edges of said legs abutting said interior walls thereby locking said pin within said hole against both axial removal and rotation.

3. A dragline bucket rigging as defined by claim 2 wherein said legs of said retainer each include free ends with chamfers on the inside and outside edges thereof.

4. A dragline bucket rigging as defined by claim 2 wherein a working load is applied through said component to said pin in a first direction, said retainer opening in said first direction.

5. A dragline bucket rigging as defined by claim 2 including only one said retainer for each said pin.

6. Method for removably connecting rigging components to each other including inserting a pin into a hole extending through the components to be connected together with a head end of said pin protruding from a side face of one of said components, forming a pair of slanted slots on opposite sides of the head of said pin outside of said hole, securing a protective cover to said side face around said hole, providing a channel with outwardly flared opposite open ends in said cover adjacent said side face and aligned with said slots, placing a removable snap-fit retainer in said channel in interfitting relationship with said channel and said slots, and utilizing the retainer to both prevent rotation of said pin within and axial movement thereof out of said hole.

7. Method of constructing a connection between interfitting yoke and link components of a dragline bucket rigging wherein the yoke and link components include aligned holes for receiving a pin to connect the components together, said method comprising the steps of providing an open-ended channel in one of said components with said channel communicating therethrough with said hole and having a narrowed mid-section, constructing a pair of slots on opposite sides of said pin and inserting said pin into said hole until said slots register with said channel, providing a spring slip retainer sized to snap fit within said channel and said slots, and inserting a spring clip into said channel to lock said pin therein against rotation and axial removal.

* * * * *